US011357014B2

(12) United States Patent
Han et al.

(10) Patent No.: US 11,357,014 B2
(45) Date of Patent: Jun. 7, 2022

(54) DETERMINE AVAILABLE FREQUENCIES BASED ON FREQUENCIES AND ENERGY LEVELS OF INTERFERENCES

(71) Applicant: Hewlett Packard Enterprise Development LP, Houston, TX (US)

(72) Inventors: Jianpo Han, Beijing (CN); Guangzhi Ran, Beijing (CN); Qiang Zhou, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 259 days.

(21) Appl. No.: 16/753,270

(22) PCT Filed: Oct. 23, 2017

(86) PCT No.: PCT/CN2017/107330
§ 371 (c)(1),
(2) Date: Apr. 2, 2020

(87) PCT Pub. No.: WO2019/079938
PCT Pub. Date: May 2, 2019

(65) Prior Publication Data
US 2020/0337060 A1 Oct. 22, 2020

(51) Int. Cl.
*H04L 12/26* (2006.01)
*H04W 72/08* (2009.01)
*H04W 24/08* (2009.01)

(52) U.S. Cl.
CPC ......... *H04W 72/082* (2013.01); *H04W 24/08* (2013.01)

(58) Field of Classification Search
CPC .................. H04W 72/082; H04W 24/08

USPC ................. 370/252, 204–215; 375/242–245, 375/284–285, 278
See application file for complete search history.

(56) References Cited

U.S. PATENT DOCUMENTS 9,083,393 B2  7/2015  Kwusn et al.
9,319,887 B2  4/2016  Chen
9,350,477 B1* 5/2016  Jung ............... H04L 5/0007
(Continued)

FOREIGN PATENT DOCUMENTS

CN    102571269    7/2012
EP      3200532    8/2017
(Continued)

OTHER PUBLICATIONS

Heiss, H. et al., Infineon, Application Guide for Mobile Communication, (Research Paper), Jan. 20, 2017, 84 Pgs.
(Continued)

*Primary Examiner* — Thai D Hoang
(74) *Attorney, Agent, or Firm* — Hewlett Packard Enterprise Patent Department

(57) ABSTRACT

An example device comprising: a monitor to detect cellular signals; and a processor to: calculate frequencies of interferences produced due to the detected cellular signals; estimate energy levels of the interferences at the calculated frequencies; and determine available frequencies based on the calculated frequencies and the estimated energy levels to avoid transmissions on a plurality of frequency bands associated with a second order harmonic distortion, a third order harmonic distortion, a second order inter-modulation distortion (IMD 2), or a third order inter-modulation distortion (IMD 3).

15 Claims, 6 Drawing Sheets

(56) References Cited

U.S. PATENT DOCUMENTS

| | | |
|---|---|---|
| 9,356,632 B2 | 5/2016 | Weissman et al. |
| 9,577,796 B2 | 2/2017 | Ponnuswamy et al. |
| 2012/0094614 A1 | 4/2012 | Komori |
| 2013/0196648 A1 | 8/2013 | Immonen et al. |
| 2016/0302209 A1 | 10/2016 | Behravan et al. |
| 2017/0195005 A1* | 7/2017 | Heinikoski .......... H04B 7/0639 |
| 2019/0069275 A1* | 2/2019 | Kawasaki ............. H04W 72/02 |
| 2019/0173564 A1* | 6/2019 | Li ........................ H04B 7/0825 |
| 2021/0007059 A1* | 1/2021 | Piipponen ........... H04W 52/146 |

FOREIGN PATENT DOCUMENTS

| | | |
|---|---|---|
| WO | WO-2014067131 | 5/2014 |
| WO | WO-2017072552 | 5/2017 |

OTHER PUBLICATIONS

International Searching Authority, The International Search Report and the Written Opinion, dated Jul. 2, 2018, PCT/CN2017/107330, 9 Pgs.

* cited by examiner

DETERMINE AVAILABLE FREQUENCIES BASED ON FREQUENCIES AND ENERGY LEVELS OF INTERFERENCES

BACKGROUND

If a wireless network device, e.g. an access point (AP) or a mobile device, is closed to a cellular signal source, e.g. a Distribute Antenna System (DAS) or a base station, harmonic distortion and/or inter-modulation distortion produced due to cellular signals may fall in wireless local area network (WLAN) band and cause an interference leading to the WLAN environment degradation.

DETAILED DESCRIPTION

Figure 1:
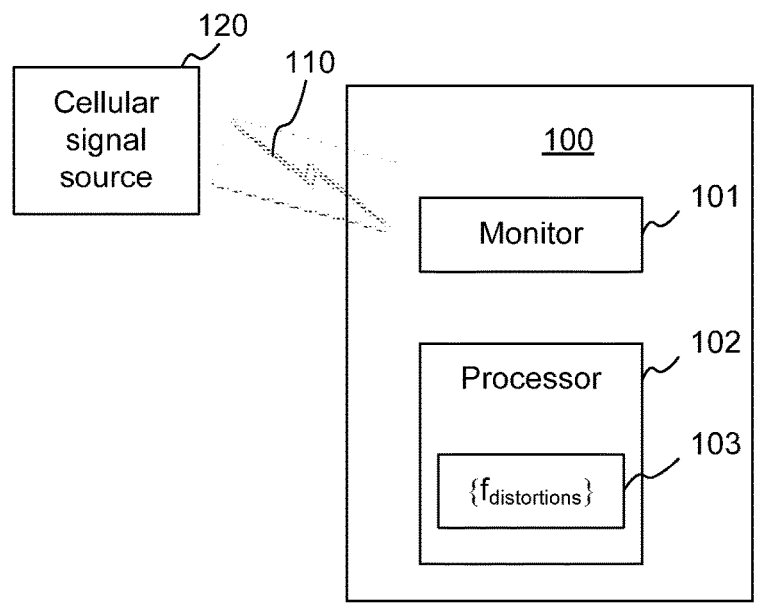
FIG. 1 is a block diagram illustrating an example of a device according to the present disclosure.

The cellular signals in different frequencies may produce unwanted interference, such as harmonic distortion and/or inter-modulation distortion. With respect to higher order harmonic distortion and/or inter-modulation distortion, wireless devices in the WLAN environment are mostly affected by the second or third order harmonic distortion and/or inter-modulation distortion.

If a wireless device is closed to the cellular signal source, and the second or third order harmonic distortion and/or inter-modulation distortion produced by the cellular signals may fail in frequencies of operating channels of the wireless device, a WLAN environment degradation may occur.

For example, in a case of an indoor WLAN deployment, antennas of DAS may be widely installed on roof of buildings and emit strong cellular signal. If the AP of the WLAN is installed near to the roof or the mobile device moves to a location close to the roof, a radio frequency (RF) link quality of the AP or the mobile device can worsen, due to the second or third order harmonic distortion and/or inter-modulation distortion that is produced by the cellular signals and falls into operating channels (i.e. the WLAN band) of the wireless device such as the AP or the mobile device.

Similarly, in a case of an outdoor WLAN deployment, the AP may be installed at the light pole and may not be far from a cellular base station. Because the downlink cellular signals emitted from the base station are rather strong, if the second or third order harmonic distortion and/or inter-modulation distortion falls into the operating channels (i.e. the WLAN band) of the AP, the RF link quality of the AP may worsen.

Especially for wireless networks occupying more frequency bands, e.g. LTE-Unlicensed (LTE-U) network or 5G network, the issue of the interference caused by the second or third order harmonic distortion and/or inter-modulation distortion may get worse.

Considering the interference is not easy to detect directly, in an example herein, the wireless device may detect the cellular signals that produce the interference, e.g. the wireless device may include a cellular modem or an application for detecting the cellular signals, which is difficult to be detected by a wireless radio. Accordingly, the wireless device may calculate frequencies of interferences produced due to the detected cellular signals, and energy levels of the interferences at the calculated frequencies may be also estimated by the wireless device.

If an interference with a high energy level falls in the frequency band of an operating channel of the Wireless device, the Wireless device may skip that operating channel when selecting the operating channels for transmission. The operating channels, in which the interferences with high energy levels do not fall, may be chosen.

In the IEEE 802.11ax standard that supports Orthogonal Frequency Division Multiple Access (OFDMA), it may not be efficient to give up the whole operating channel occupied by the interference with high energy level, because not all Resource Units (RUs) need to be reserved.

In one example, a device comprises a monitor to detect cellular signals, and the device comprises a processor to calculate frequencies of interferences produced due to the detected cellular signals, to estimate energy levels of the interferences at the calculated frequencies, and to determine available frequencies based on the calculated frequencies and the estimated energy levels of the interferences to avoid transmissions on a plurality of frequency bands associated with a second order harmonic distortion, a third order harmonic distortion, a second order inter-modulation distortion (IMD 2), or a third order inter-modulation distortion (IMD 3). The device may be a wireless device, such as a network device, an access point (AP) or a mobile device.

As used herein, a "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

In another example, a method for preventing environment degradation, comprises: calculating, by a processor of a wireless device, frequencies of interferences produced due to cellular signals detected by a monitor of the wireless device; estimating, by the processor, energy levels of the interferences at the calculated frequencies; and determining, by the processor, available frequencies according to the calculated frequencies and the estimated energy levels of the interferences to avoid transmissions on a plurality of frequency bands associated with a second order harmonic distortion, a third order harmonic distortion, a second order inter-modulation distortion, or a third order inter-modulation distortion.

In another example, a non-transitory computer readable storage medium stores instructions that, when executed by a processor of a wireless device, causes the processor to calculate frequencies of interferences produced due to cellular signals detected by a monitor of the wireless device, to estimate energy levels of the interferences at the calculated frequencies, and to determine available frequencies based on the calculated frequencies and the estimated energy levels of the interferences to avoid transmissions on a plurality of frequency bands associated with a second order harmonic distortion, a third order harmonic distortion, a second order inter-modulation distortion, or a third order inter-modulation distortion.

It is appreciated that examples described herein below may include various components and features. Some of the components and features may be removed and/or modified without departing from a scope of the device, method and non-transitory computer readable storage medium for preventing environment degradation.

It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example of a device according to the present disclosure. Referring to FIG. 1, the device 100 may be a wireless device, such as the AP or the mobile device.

The device 100 includes a monitor 101 capable of detecting cellular signals 110 emitted from the cellular signal source 120, e.g. DAS or base station, not far from the device 100. The monitor 101 may support all frequencies allowed by local regulation of the device 100. The monitor 101 may scan all operating channels, and collects the information of nearby cellular signals, especially the downlink cellular signals. The information of nearby cellular signals may include frequency, bandwidth, Received Signal Strength Indication (RSSI), duty cycle, etc.

The device 100 includes a processor 102, the processor 107 may calculate the frequencies of at least the second and third orders inter-modulation distortions produced due to the detected cellular signals, by utilizing the information info-collected by the monitor 101, e.g. by utilizing at least the frequencies included in the collected information. Since the higher orders inter-modulation distortions are weak, the considered the interferences may not include the higher orders inter-modulation distortions. For example, when two cellular signals with frequencies $f_1$ and $f_2$ are detected by the monitor 101, it is possible for the two cellular signals with frequencies $f_1$ and $f_2$ to interact and produce unwanted harmonic distortion and inter-modulation distortion.

Figure 2:
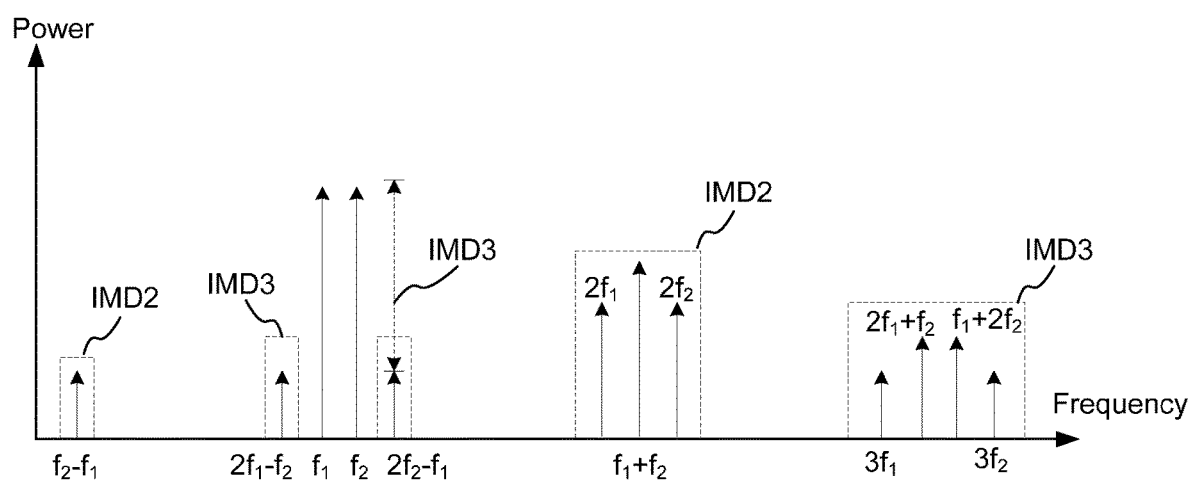
FIG. 2 is a diagram illustrating an example of a distribution of frequencies of the interferences according to the present disclosure.

FIG. 2 is a diagram illustrating an example of a distribution of frequencies of the interferences according to the present disclosure. Referring to FIG. 2, the processor 102 may calculate a difference between the frequencies $f_2-f_1$, a sum of the frequencies $f_1+f_2$, and values $2f_1$ and $2f_2$ as the frequencies that the second order inter-modulation distortion (IMD 2) falls in. Moreover, the processor 102 may calculate the values $2f_1-f_2$, $2f_2-f_1$, $3f_1$, $2f_1+f_2$, $f_1+2f_2$ and $3f_2$, as the frequencies that the third order inter-modulation distortion (IMD 3) falls in.

The processor 102 may estimate energy levels of the second and third orders inter-modulation distortions at the calculated frequencies by looking up table. With respect to calculating the value of the energy, the energy level is easier to be estimate.

If the second and third orders harmonic distortions are further desired or needed to be considered, the frequencies of the second and third orders harmonic distortions may be also calculated by utilizing at least the frequencies included the information collected by the monitor 101, and the energy levels of the second and third orders harmonic distortions at the calculated frequencies may be also estimated by looking up table.

The table may be established by testing all input cellular signal cases and measuring the generated second and third orders inter-modulation distortions. The table may include the relationship between the energies levels and the interferences produced due to different cellular signals failing in different frequencies.

The processor 102 may determine the frequencies available to the device 100 based on the calculated frequencies and the estimated energy levels of the interferences to avoid transmissions on a plurality of frequency bands associated with a second order harmonic distortion, a third order harmonic distortion, a second order inter-modulation distortion, or a third order inter-modulation distortion, so as to keep the transmission away from the frequency band that the second and third orders inter-modulation distortions and/or the second and third orders harmonic distortions fall in.

The frequencies in which the interference with a high energy level falls may be regarded as an unavailable frequencies' set $\{f_{distortions}\}$ 103, and may facilitate the processor 102 to determine the frequencies available to the device 100.

Take the cellular signals of Global System for Mobile Communication (GSM) –750 or 850 for example, the generated third order inter-modulation distortion fall in the frequencies of 2.450 GHz, 2.35 GHz, 0.95 GHz, 0.55 GHz and 2.45 GHz by the calculating, and the third order inter-modulation distortion falling is estimated to be in the frequency of 2.450 GHz by in a high energy level by looking up the table.

When the device 100 selects the operating channels to transmit the symbols, the operating channels corresponding to the frequency of 2.450 GHz may be skipped by the device 100, or some RUs on the operating channels corresponding to the frequency of 2.450 GHz may be reserved by the device 100.

Accordingly, the processor 102 may abandon the operating channels at unavailable frequencies source or determine channels at unavailable frequencies as non-operating channels, in the case of Orthogonal Frequency Division Multiplexing (OFDM) or OFDMA. Or, the processor 102 reserves RUs on the operating channels at unavailable frequencies, in the case of OFDMA.

Besides, it can be understood that the device 100 may also include a wireless radio, a storage, a memory etc.

Figure 3:
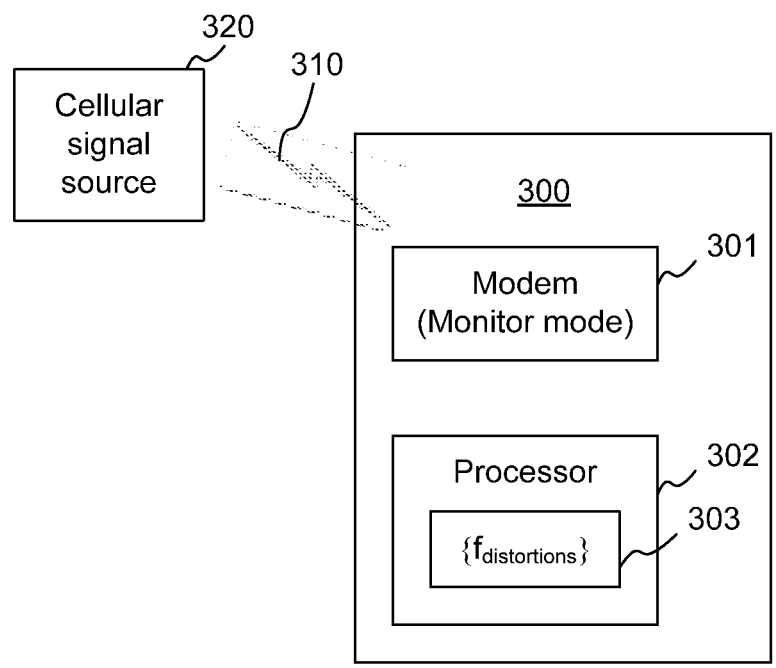
FIG. 3 is a block diagram illustrating another example of a device according to the present disclosure.

FIG. 3 is a block diagram illustrating another example of a device according to the present disclosure. Referring to FIG. 3, the device 300 such as an AP includes a modem 301 and a processor 302.

The modem 301 may be a cellular modem, e.g. a GSM modem, a Wideband Code Division Multiple Access (WCDMA) modem, or a Long Term Evolution (LTE) modem, etc. In other word, the cellular modem 301 may work as a 2G/3G/4G/5G sniffer.

The modem 301 may work in monitor mode, or may work as a sniffer, such that the modem 301 is capable of detecting the cellular signals. It can be understood that the device 300 may include a wireless radio or another modem (not shown) working in transmission mode to transmit wireless signals or symbols, another modem may be a wireless or WLAN modem.

Accordingly, the modem 301 may be regarded as a redundant modem for transmitting the wireless signals or symbols. In other words, the modem may be regarded as an added modem for the device 300 (i.e. the AP), and the modem 301 may be built-in or pluggable.

The modem 301 may support all frequency allowed by local regulation of the device 300. The modem 301 may scan all operating channels, and may collect the information of nearby cellular signals 310 emitted from the cellular signal source 320, e.g. DAS or the cellular base station, especially the downlink cellular signals. The processor 302 may communicate with the modem 301 to receive the collected information of the detected cellular signals from the modem 301.

The processor 302 may calculate the frequencies of the second or third order harmonic distortion and/or inter-modulation distortion produced due to the cellular signals detected by the modem 301 working in monitor mode, by utilizing at least the frequencies included in the collected information, as mentioned above.

The processor 302 may estimate energy levels of the second or third order harmonic distortion and/or inter-modulation distortion at the calculated frequencies by looking up table, and may determine the frequencies available to the device 300 based on the calculated frequencies and the estimated energy levels of the interferences to avoid transmissions on a plurality of frequency bands associated with a second order harmonic distortion, a third order harmonic distortion, a second order inter-modulation distortion, or a third order inter-modulation distortion, so as to keep the transmission away from the frequency band that the second or third order inter-modulation distortion and/or the second and third orders harmonic distortion falls in.

The processor 302 may abandon the operating channels unavailable frequencies source or determine channels at unavailable frequencies as non-operating channels in the case of OFDM or OFDMA, or the processor 302 may reserve RUs on the operating channels at unavailable frequencies in the case of OFDMA, such that the operating channels or the RUs affected by the second and third orders inter-modulation distortions and/or the second and third orders harmonic distortion may be skipped by the device 300, when the device 300 selects the available operating channels to transmit the wireless symbols.

The frequencies in which the interference with a high energy level falls may be regarded as an unavailable frequencies' set $\{f_{distortions}\}$ 303, and may be used by the processor 302 when determining the frequencies available to the device 300.

Figure 4:
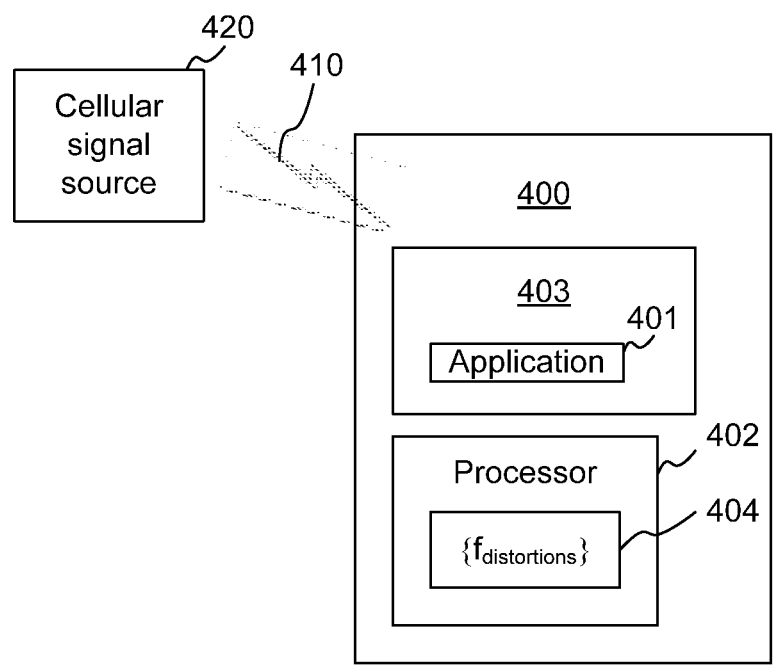
FIG. 4 is a block diagram illustrating another example of a device according to the present disclosure.

FIG. 4 is a block diagram illustrating another example of a device according to the present disclosure. Referring to FIG. 4, the device 400 such as a mobile device includes a processing unit 301 and a processor 302.

The device 400 may be a smartphone, a mobile phone, a Personal Digital Assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device capable of transmitting and receiving wireless transmissions.

The processing unit 401 may run an application 403 capable of monitoring the cellular signals. The device 400, such as the mobile device, may include a cellular modem (not shown) working in transmission mode, to support the cellular communication of the mobile device. Accordingly, the application 403 may monitor the cellular signal 410, which are emitted from the cellular signal source 420, e.g. DAS or the cellular base station, through the cellular modem.

The cellular modem may support all frequency allowed by local regulation of the device 400. The application 403 may monitor and collect the information of the cellular signals transmitted from or received by the modem 401, based on the processing unit 401 coupled to the modem 401. Moreover, a wireless modem (not shown) may be also included in the device 400, and the application 403 may monitor the information from the wireless modem or the WLAN modem.

The processor 402 may communicate with the processing unit 401 to receive the information of the detected cellular signals collected by the application 403 run by the processing unit 401.

The processor 402 may calculate the frequencies of the second or third order harmonic distortion and/or inter-modulation distortion produced due to the cellular signals detected by the application 403 run by the processing unit 401, by utilizing at least the frequencies included in the collected information, as mentioned above.

The processor 402 may estimate energy levels of the second or third order harmonic distortion and/or inter-modulation distortion at the calculated frequencies by looking up table, and may determine the frequencies available to the device 400 based on the calculated frequencies and the estimated energy levels of the interferences to avoid transmissions on a plurality of frequency bands associated with a second order harmonic distortion, a third order harmonic distortion, a second order inter-modulation distortion, or a third order inter-modulation distortion, so as to keep the transmission away from the frequency band that the second and third orders inter-modulation distortions and/or the second and third orders harmonic distortions fall in.

If the processor 402 may abandon the operating channels at unavailable frequencies source or determine channels at unavailable frequencies as non-operating channels in the case of OFDM or OFDMA, or the processor 402 may reserve RUs on the operating channels at unavailable frequencies in the case of OFDMA, the operating channels or the RUs affected by the second or third orders inter-modulation distortions and/or the second and third orders harmonic distortion may be skipped by the device 400, when the device 400 selects available operating channels to transmit the wireless or WLAN signals.

The frequencies in which the interference with a high energy level falls may be regarded as an unavailable frequencies' set $\{f_{distortions}\}$ 404. The processor 402 may determine the frequencies available to the device 400 based on the set $\{f_{distortions}\}$ 404.

Figure 5:
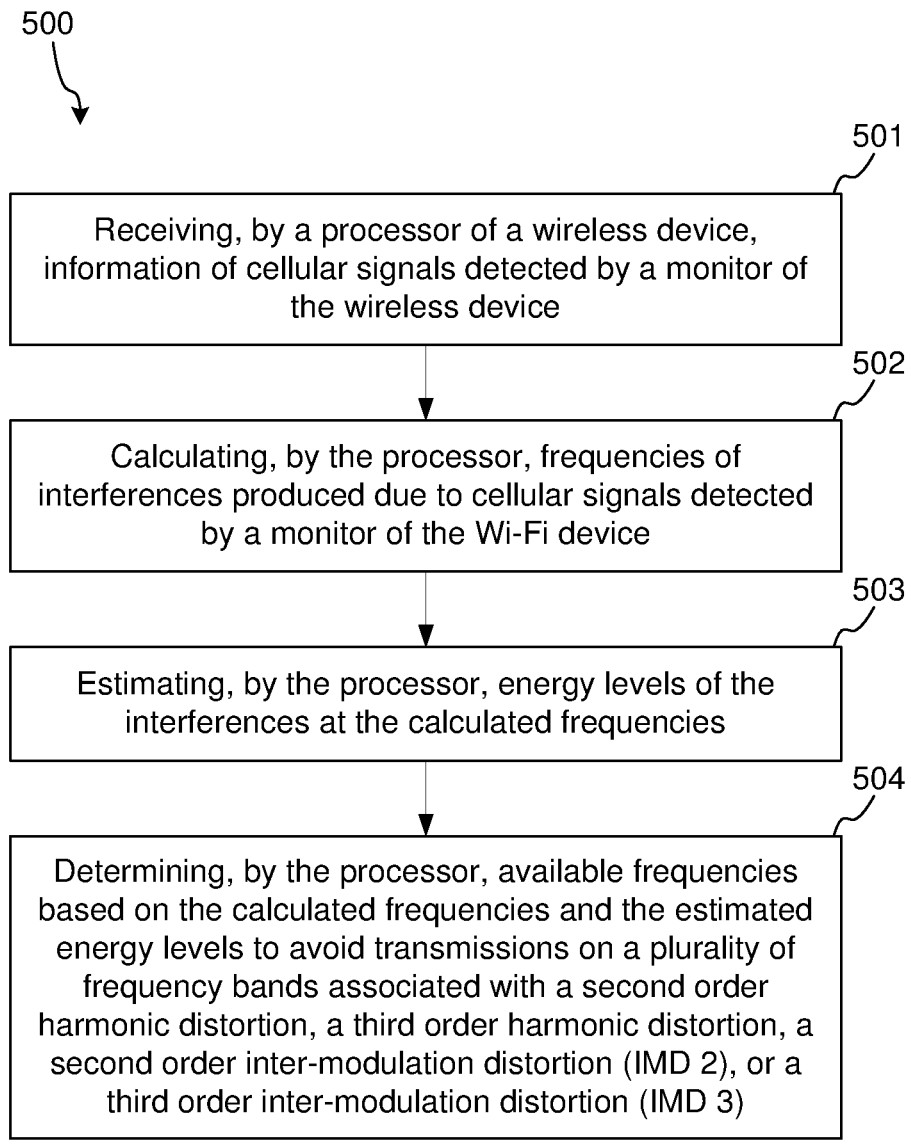
FIG. 5 is a flow chart illustrating an example of a method for improving link quality according to present disclosure.

FIG. 5 is a flow chart illustrating an example of a method for improving link quality according to present disclosure. Referring to FIG. 5:

A method 500 for preventing environment degradation comprises: receiving, by a processor of a wireless device, information of cellular signals detected by a monitor of the wireless device, at 501. In an example, the wireless device may be the AP, and the monitor may be an added or redundant cellular modem that works in monitor mode or work as a sniffer. Instead, in another example, the wireless device is the mobile device, and the monitor may be a processing unit running the application capable of detecting the cellular signals. Moreover, the downlink cellular signals may be prioritized to be considered, when the monitor detects the cellular signals.

The method 500 comprises calculating, by the processor, frequencies of interferences produced due to the cellular signals according to the information, at 502. In an example, the frequencies of interferences may be calculated by utilizing the information collected by the monitor, e.g. by utilizing at least the frequencies of the cellular included in the collected information. Moreover, the considered interferences may at least comprise the second or third order harmonic distortion and/or the second or third order inter-modulation distortion.

The method 500 comprises estimating, by the processor, energy levels of the interferences at the calculated frequencies, at 503. In an example, the energy levels of the interferences at the calculated frequencies may be estimated by looking up table, and the table may be established by in-house test, where all input cellular signal cases are tested and the interferences are measured.

The method 500 comprises determining, by the processor, available frequencies based on the calculated frequencies and the estimated energy levels to avoid transmissions on a plurality of frequency bands associated with a second order harmonic distortion, a third order harmonic distortion, a second order inter-modulation distortion, or a third order inter-modulation distortion, at 504. In an example, the operating channels at unavailable frequencies source nay be considered to be abandoned or the channels at unavailable frequencies may be determined as non-operating channels, by the processor, in the case of OFDM or OFDMA. In another example, it is feasible to reserve, by the processor, the RUs on the operating channels at unavailable frequencies, in the case of OFDMA.

Figure 6:
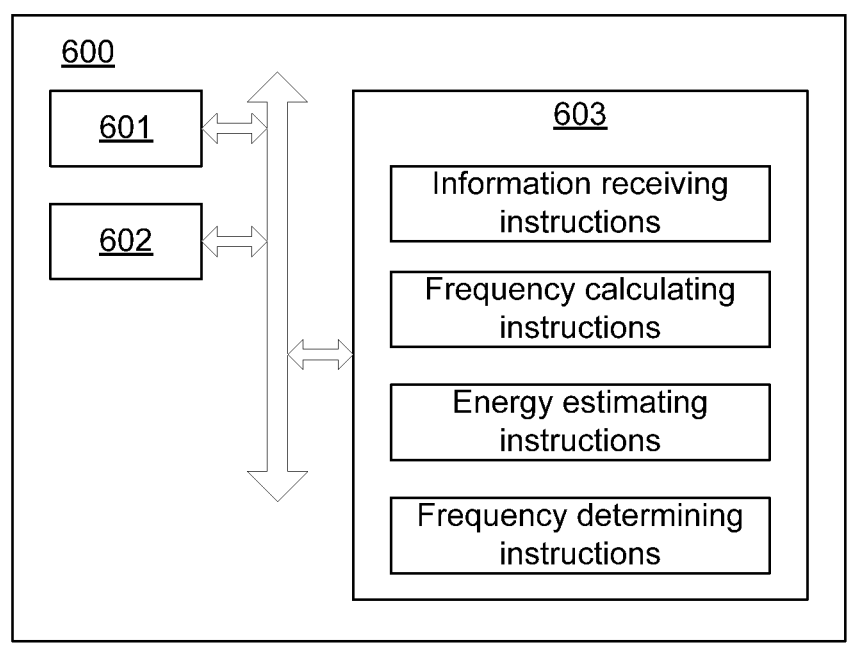
FIG. 6 is a schematic illustrating an example of components for implementing the device shown in FIG. 1 according to present disclosure.

FIG. 6 is a schematic illustrating an example of components for implementing the device shown in FIG. 1 according to present disclosure. Referring to FIG. 6, the component 600 is suitable to implement a device such as the AP, and includes a cellular modem 601, a processor 602, and a non-transitory computer readable storage medium 603.

The cellular modem 601 may detect the cellular signals and collects the information of the cellular signals, especially the downlink cellular signals. The non-transitory computer readable storage medium 603 stores instructions excitable for the possessor 602.

The instructions include information receiving instructions, when executed by the processor 602, causes the processor 602 to receive the information of cellular signals detected by the cellular modem 601.

The instructions include frequency calculating instructions, when executed by the processor 602, causes the processor 602 to calculate frequencies of interferences produced due to the cellular signals according to the information. In an example, the frequencies of interferences may be calculated by utilizing at least the frequencies of the detected cellular included in the information. Moreover, the considered interferences may at least comprise the second or third order harmonic distortion and/or the second or third order inter-modulation distortion.

The instructions include energy estimating instructions, when executed by the processor 602, causes the processor 602 to estimate energy levels of the interferences at the calculated frequencies. In an example, the energy estimating instructions may further cause the processor 602 to access a table for estimating the energy levels of the interferences by looking up table.

The instructions include frequency determining instructions, when executed by the processor 602, causes the processor 602 to determine available frequencies based on the calculated frequencies and the estimated energy levels to avoid transmissions on a plurality of frequency bands associated with a second order harmonic distortion, a third order harmonic distortion, a second order inter-modulation distortion, or a third order inter-modulation distortion. In an example, the frequency determining instructions further cause the processor 602 to abandon the operating channels at unavailable frequencies source or to determine channels at unavailable frequencies as non-operating channels, or the frequency determining instructions further cause the processor 602 to reserve the RUs on the operating channels at unavailable frequencies.

Figure 7:
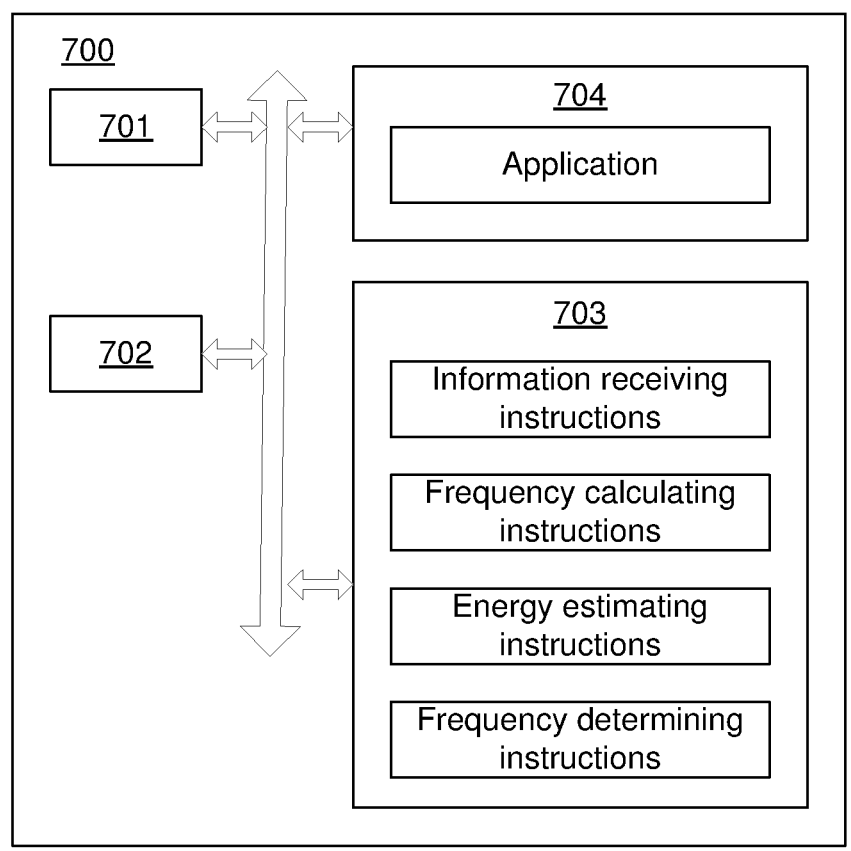
FIG. 7 is a schematic illustrating another example of components for implementing the device shown in FIG. 1 according to present disclosure.

FIG. 7 is a schematic illustrating another example of components for implementing the device shown in FIG. 1 according to present disclosure. Referring to FIG. 7, the component 600 is suitable to implement a device such as the mobile device, and includes a processing unit 701, a processor 702, a non-transitory computer readable storage medium 703, and a non-volatile or volatile memory 704.

The memory 704 can store an application to be run by the processing unit 701. The application stored in the memory 704 and executable for the processing unit 701 has the function of detecting the cellular signals and collecting the information of the cellular signals, especially the downlink cellular signals.

The non-transitory computer readable storage medium 703 can store instructions excitable for the possessor 702.

The instructions include information receiving instructions, when executed by the processor 702, causes the processor 702 to receive the information of cellular signals detected by the application stored run by the processing unit 701.

The instructions include frequency calculating instructions, when executed by the processor 702, causes the processor 702 to calculate frequencies of interferences, e.g. the second or third order harmonic distortion and/or the second or third order inter-modulation distortion, produced due to the cellular signals according to the information. In an example, the frequencies of interferences may be calculated by utilizing at least the frequencies of the detected cellular included in the information.

The instructions include energy estimating instructions, when executed by the processor 702, causes the processor 702 to estimate energy levels of the interferences at the calculated frequencies. In an example, the processor 702 may be further caused by the energy estimating instructions to access a table for estimating the energy levels of the interferences by looking up table.

The instructions include frequency determining instructions, when executed by the processor 702, causes the processor 702 to determine available frequencies based on the calculated frequencies and the estimated energy levels to avoid transmissions on a plurality of frequency bands associated with a second order harmonic distortion, a third order harmonic distortion, a second order inter-modulation distortion, or a third order inter-modulation distortion. Moreover, the processor 702 may be further caused by the frequency determining instructions to abandon operating channels at unavailable frequencies source or determine channels at unavailable frequencies as non-operating channels, or the processor 702 may be further caused by the frequency determining instructions to reserve the RUs on operating channels at unavailable frequencies.

While the present disclosure has been described in connection with certain example embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A device comprising:
a monitor to detect cellular signals; and
a processor to:
calculate frequencies of interferences produced due to the detected cellular signals;
estimate energy levels of the interferences at the calculated frequencies; and
determine available frequencies based on the calculated frequencies and the estimated energy levels of the interferences to avoid transmissions on a plurality of frequency bands associated with a second order harmonic distortion, a third order harmonic distortion, a second order inter-modulation distortion (IMD 2), or a third order inter-modulation distortion (IMD 3).

2. The device of claim 1, wherein the detected cellular signals at least include downlink cellular signals.

3. The device of claim 1, wherein the monitor includes a cellular modem working in monitor mode.

4. The device of claim 1, wherein the monitor includes a processing unit running an application capable of monitoring the cellular signals.

5. The device of claim 1, wherein the interferences comprise at least one of a second order harmonic distortion, a third order harmonic distortion, a second order inter-modulation distortion, and a third order inter-modulation distortion.

6. The device of claim 1, wherein the processor further to:
determine channels at unavailable frequencies as non-operating channels.

7. The device of claim 1, wherein the processor further to:
reserve Resource Units (RUs) on channels at unavailable frequencies.

8. The device of claim 1, wherein the device comprises an access point (AP) or a mobile device.

9. A method for preventing environment degradation, comprising:
receiving, by a processor of a wireless device, information of cellular signals detected by a monitor of the wireless device;
calculating, by the processor, frequencies of interferences produced due to the cellular signals according to the information;
estimating, by the processor, energy levels of the interferences at the calculated frequencies; and
determining, by the processor, available frequencies based on the calculated frequencies and the estimated energy levels to avoid transmissions on a plurality of frequency bands associated with a second order harmonic distortion, a third order harmonic distortion, a second order inter-modulation distortion (IMD 2), or a third order inter-modulation distortion (IMD 3).

10. The method of claim 9, wherein the detected cellular signals at least include downlink cellular signals.

11. The method of claim 9, wherein the interferences comprise at least one of a second order harmonic distortion, a third order harmonic distortion, a second order inter-modulation distortion, and a third order inter-modulation distortion.

12. The method of claim 9, further comprising:
determining, by the processor, channels at unavailable frequencies as non-operating channels.

13. The method of claim 9, further comprising:
reserving, by the processor, Resource Units (RUs) on channels at unavailable frequencies.

14. A non-transitory computer readable storage medium storing instructions that, when executed by a processor of a wireless device, causes the processor to:
receive information of cellular signals detected by a monitor of the wireless device;
calculate frequencies of interferences produced due to cellular signals detected by a monitor of the wireless device according to the information;
estimate energy levels of the interferences at the calculated frequencies; and
determine available frequencies based on the calculated frequencies and the estimated energy levels to avoid transmissions on a plurality of frequency bands associated with a second order harmonic distortion, a third order harmonic distortion, a second order inter-modulation distortion (IMD 2), or a third order inter-modulation distortion (IMD 3).

15. The non-transitory computer readable storage medium of claim 14, wherein the interferences comprise at least one of a second order harmonic distortion, a third order harmonic distortion, a second order inter-modulation distortion, and a third order inter-modulation distortion.

* * * * *